(12) United States Patent
Kida

(10) Patent No.: US 7,525,790 B2
(45) Date of Patent: Apr. 28, 2009

(54) SOLID ELECTROLYTIC CAPACITOR WITH FACE-DOWN TERMINALS

(75) Inventor: Fumio Kida, Miyagi (JP)

(73) Assignee: NEC TOKIN Corporation, Sendai-shi (JP)

( * ) Notice: Subject to any disclaimer, the term of this patent is extended or adjusted under 35 U.S.C. 154(b) by 217 days.

(21) Appl. No.: 11/600,468

(22) Filed: Nov. 16, 2006

(65) Prior Publication Data

US 2007/0115614 A1 May 24, 2007

(30) Foreign Application Priority Data

Nov. 18, 2005 (JP) ............................. 2005-334094

(51) Int. Cl.
*H01G 9/00* (2006.01)
(52) U.S. Cl. .................. 361/523; 361/516; 361/519; 361/525; 361/528; 361/529
(58) Field of Classification Search ............. 361/523, 361/525, 528, 529, 516–519, 531, 532, 533, 361/538–540
See application file for complete search history.

(56) References Cited

U.S. PATENT DOCUMENTS

| | | | |
|---|---|---|---|
| 6,891,717 B2 * | 5/2005 | Fujii et al. ............ | 361/523 |
| 6,903,922 B2 * | 6/2005 | Sano et al. ............ | 361/533 |
| 6,975,503 B2 * | 12/2005 | Abe et al. ............ | 361/533 |
| 7,110,245 B2 * | 9/2006 | Ishida et al. .......... | 361/538 |

FOREIGN PATENT DOCUMENTS

| | | |
|---|---|---|
| JP | 2002367862 A | 12/2002 |
| JP | 2003133177 A | 5/2003 |
| JP | 2004349270 A | 12/2004 |

\* cited by examiner

*Primary Examiner*—Nguyen T Ha
(74) *Attorney, Agent, or Firm*—Frishauf, Holtz, Goodman & Chick, P.C.

(57) ABSTRACT

A solid electrolytic capacitor with face-down terminals includes a capacitor element having an anode lead drawn out therefrom in an offset manner, an anode terminal, a cathode terminal, and an insulating casing resin. At a rectangular mount surface having a first and a second side parallel to each other and forming an outer bottom portion, four terminal exposed portions are provided such that a terminal pair composed of the two terminal exposed portions are located at the first side and a terminal pair composed of the other two terminal exposed portions are located at the second side. The two terminal exposed portions located at the first side serve as mount-surface exposed portions of the anode terminal and the cathode terminal, while, the two terminal exposed portions located at the second side serve as dummy terminals that are not electrically connected to the capacitor element.

16 Claims, 14 Drawing Sheets

PRIOR ART 3

SOLID ELECTROLYTIC CAPACITOR WITH FACE-DOWN TERMINALS

This application claims priority to prior Japanese patent application JP 2005-334094, the disclosure of which is incorporated herein by reference.

BACKGROUND OF THE INVENTION

This invention relates to a solid electrolytic capacitor with face-down terminals having electrodes directly drawn out to its board mount side.

Solid electrolytic capacitors using tantalum, niobium, or the like as a valve-action metal are small in size, large in capacitance, and excellent in frequency characteristic and have thus been widely used in decoupling circuits or power circuits of CPUs and so on. Following the recent development of portable electronic devices, there has been increasing commercialization of solid electrolytic capacitors with face-down terminals for the purpose of achieving low ESR (equivalent series resistance) and low ESL (equivalent series inductance) particularly at a high frequency range.

As a technique disclosed as such a solid electrolytic capacitor with face-down terminals, there is an example of Patent Document 1 (Japanese Unexamined Patent Application Publication (JP-A) No. 2002-367862). FIG. 11 is a longitudinal sectional view showing a solid electrolytic capacitor with face-down terminals according to prior art 1, wherein numeral 51 denotes a capacitor element, 52 an anode lead, 53 an anode terminal, 55 a cathode terminal, and 64 a casing resin.

However, as shown in FIG. 11, the distance between the cathode terminal 55 and the anode terminal 53 at the mount surface is long and thus the distance of a current path becomes long when the capacitor is mounted on an external circuit board, and therefore, the ESR and ESL of the entire capacitor cannot be said to be minimal.

As a technique disclosed for the purpose of achieving low ESR and low ESL at a higher frequency range, there is an example of Patent Document 2 (Japanese Unexamined Patent Application Publication (JP-A) No. 2003-133177 (FIG. 15)). FIGS. 12A and 12B show a solid electrolytic capacitor with face-down terminals according to prior art 2, wherein FIG. 12A is a longitudinal sectional view of the capacitor alone and FIG. 12B is a longitudinal sectional view in which the capacitor is mounted on a circuit board. Herein, 62 denotes a circuit board, 66 a solder, and 67 a land.

As shown in FIGS. 12A and 12B, in the solid electrolytic capacitor with face-down terminals according to this technique, a cathode terminal 55 is provided so as to extend to the vicinity of an anode terminal 53 and thus the distance of a current path formed by the anode terminal 53, an anode lead 52, a capacitor element 51, and the cathode terminal 55 can be shortened with respect to the external circuit board 62, thereby enabling a further reduction in ESL. However, there is a problem that since a difference in area between a cathode exposed portion and an anode exposed portion increases, the solder 66 applied on the land 67 corresponding to a cathode terminal exposed portion 56 and thus having a larger area shrinks due to surface tension, so that the solid electrolytic capacitor with face-down terminals mainly placed on this solder 66 is raised and subjected to position offset, thus resulting in occurrence of failure in appearance and, further, occurrence of connection failure on the anode terminal side.

As a technique disclosed as means for solving this problem, there is an example of Patent Document 3 (Japanese Unexamined Patent Application Publication (JP-A) No. 2004-349270). In this example, the shape as shown in FIGS. 13A to 13C and FIG. 14 is proposed as that of a solid electrolytic capacitor with face-down terminals which can be well soldered to a circuit board or the like. FIGS. 13A to 13C and FIG. 14 show a solid electrolytic capacitor with face-down terminals according to prior art 3, wherein FIG. 13A is a front view thereof, FIG. 13B is a bottom view thereof, FIG. 13C is a right side view thereof, and FIG. 14 is a longitudinal sectional view showing the state where the capacitor is mounted on a circuit board.

At the bottom surface of the solid electrolytic capacitor with face-down terminals, a cathode terminal 55 has a first cathode exposed portion 58 exposed at a position near an anode exposed portion 54 where an anode terminal 53 is exposed, and a second cathode exposed portion 57 exposed at a position symmetrical to that of the anode exposed portion 54. As shown in FIG. 14, the cathode terminal 55 is provided with a concave portion by sputtering or the like between the first cathode exposed portion 58 and the second cathode exposed portion 57 and a casing resin is filled in the concave portion, thereby forming a cathode embedded portion 68.

The anode exposed portion 54 and the second cathode exposed portion 57 respectively extend to opposite ends (left and right ends in FIG. 13B) of the solid electrolytic capacitor with face-down terminals in a draw-out direction (implant direction) of an anode lead 52 of a capacitor element 51. On the other hand, the first cathode exposed portion 58 has extending portions 59 respectively extending to opposite ends (upper and lower ends in FIG. 13B) in a direction perpendicular to the draw-out direction of the anode lead 52, using the bottom surface of the solid electrolytic capacitor with face-down terminals as a reference.

However, in the solid electrolytic capacitor with face-down terminals in which the terminal shapes exposed at the bottom surface are not completely symmetrical on the left and right sides, when fixing it to a circuit board 62 through a solder 66, there is a possibility that a difference in surface tension occurs between the left and right sides during contraction of the solder and hence the capacitor is not accurately fixed to lands 67 on the circuit board 62, resulting in position offset and thus in occurrence of failure in appearance. Further, since the first cathode exposed portion 58 has the extending portions 59, the capacitor has a structure in which terminal cut surfaces are exposed on its four sides and, therefore, all the four sides should be cut into predetermined shapes by dicing or the like, leading to an increase in the number of processing steps and thus to an increase in production cost of products.

The foregoing prior art problems are summarized as follows. In the prior art of Patent Document 1, although the exposed terminals are symmetrical on the left and right sides, the current path distance between the anode and the cathode becomes long and thus the ESR and ESL of the entire capacitor increase at the high frequency range. In the prior art of Patent Document 2, since the area of the cathode exposed portion is greater than that of the anode exposed portion, the anode side is raised during contraction of the solder and thus the connection failure tends to occur. According to the prior art of Patent Document 3, in the solid electrolytic capacitor with face-down terminals in which the terminal shapes exposed at the mount surface are not completely symmetrical on the left and right sides, when fixing it to the circuit board through the solder, there is a possibility that a difference in surface tension occurs between the left and right sides during contraction of the solder and hence the capacitor is not accurately fixed to the lands on the circuit board, resulting in position offset and thus in occurrence of failure in appearance. Further, since the first cathode exposed portion has the extending portions, the capacitor has the structure in which the terminal cut surfaces are exposed on its four sides and, therefore, all the four sides should be cut into the predetermined shapes by dicing or the like, leading to an increase in the number of processing steps and thus to an increase in production cost of products.

SUMMARY OF THE INVENTION

Under these circumstances, it is an object of this invention to provide a solid electrolytic capacitor with face-down terminals that has a short current path distance between an anode and a cathode and low ESR and ESL at a high frequency range and can be manufactured at a low cost.

According to the present invention, there is provided a solid electrolytic capacitor with face-down terminals comprising a capacitor element having a dielectric, an electrolyte, and a cathode layer formed in order on a surface of a porous sintered body made of a valve-action metal and having an anode lead drawn out therefrom so as to be offset in a direction substantially perpendicular to an anode lead draw-out direction, an anode terminal having one end connected to the anode lead and the other end serving as an anode exposed portion exposed at a mount surface, a cathode terminal connected to the cathode layer of the capacitor element and having an end serving as a cathode exposed portion exposed at the mount surface, and an insulating casing resin covering the capacitor element, the anode terminal, and the cathode terminal, wherein, at the rectangular mount surface having a first and a second side parallel to each other and forming an outer bottom portion, four terminal exposed portions are provided such that a pair of the two terminal exposed portions are located at the first side and a pair of the other two terminal exposed portions are located at the second side, and wherein the two terminal exposed portions located at the first side serve as the anode exposed portion of the anode terminal and the cathode exposed portion of the cathode terminal, respectively, and the two terminal exposed portions located at the second side serve as dummy terminals that are not electrically connected to the capacitor element.

By employing this shape, the current path can be shortened and further the terminals exposed at the mount surface are completely symmetrical on the left and right sides. Therefore, when fixing the capacitor to a circuit board, a difference in surface tension does not occur between the left and right sides during contraction of a solder and hence the capacitor is accurately fixed to lands on the circuit board. Consequently, position offset and thus failure in appearance hardly occur.

According to another aspect of the invention, solid electrolytic capacitor with face-down terminals comprises a capacitor element having a dielectric, an electrolyte, and a cathode layer formed in the order named on a surface of a porous sintered body made of a valve-action metal and having an anode lead drawn out therefrom so as to be offset in a direction substantially perpendicular to an anode lead draw-out direction, an anode terminal having one end connected to the anode lead and the other end serving as an anode exposed portion exposed at a mount surface, a cathode terminal connected to the cathode layer of the capacitor element and having both ends serving as cathode exposed portions exposed at the mount surface, and an insulating casing resin covering the capacitor element, said anode terminal, and the cathode terminal, wherein, at the rectangular mount surface having a first and a second side parallel to each other and forming an outer bottom portion, four terminal exposed portions are provided such that a pair of the two terminal exposed portions are located at the first side and a pair of the other two terminal exposed portions are located at the second side, and wherein the two terminal exposed portions located at the first side serve as the anode exposed portion of the anode terminal and one of the cathode exposed portions of the cathode terminal, respectively, one of the two terminal exposed portions located at the second side serves as the other of the cathode exposed portions of the cathode terminal, and the other of the two terminal exposed portions located at the second side serves as a dummy terminal that is not electrically connected to the capacitor element.

This configuration not only contributes to posture stability at the time of soldering, but also facilitates a design of a board circuit for reducing the ESR and ESL.

In accordance with a yet another aspect of the invention, a solid electrolytic capacitor with face-down terminals comprises a capacitor element having a dielectric, an electrolyte, and a cathode layer formed in the order named on a surface of a porous sintered body made of a valve-action metal and having an anode lead drawn out therefrom so as to be offset in a direction substantially perpendicular to an anode lead draw-out direction, two anode terminals each having one end connected to the anode lead and the other end serving as an anode exposed portion exposed at a mount surface, a cathode terminal connected to the cathode layer of the capacitor element and having both ends serving as cathode exposed portions exposed at the mount surface, and an insulating casing resin covering the capacitor element, the anode terminal, and the cathode terminal, wherein the anode lead is drawn out on both sides of the capacitor element and connected to the two anode terminals, wherein, at the rectangular mount surface having a first and a second side parallel to each other and forming an outer bottom portion, four terminal exposed portions are provided such that a pair of the two terminal exposed portions are located at the first side and a pair of the other two terminal exposed portions are located at the second side, and wherein, in each of the pairs, one of the two terminal exposed portions serves as one of the anode exposed portions of the anode terminals and the other of the two terminal exposed portions serves as one of the cathode exposed portions of the cathode terminal.

This configuration not only contributes to posture stability at the time of soldering, but also further facilitates a design of a board circuit for reducing the ESR and ESL.

It is preferable that the solid electrolytic capacitor with face-down terminals be formed by, after overmolding the capacitor element on a lead frame with the casing resin, cutting the lead frame and the casing resin in a direction perpendicular to the first or second side. With this configuration, the degree of freedom for designing the lead frame is increased. Further, fillet surfaces can be formed at outer side surfaces parallel to the anode lead draw-out direction. The outer side surfaces that are cut by dicing or the like may be only two among four.

It is preferable that the anode terminal and the cathode terminal are each formed with a film containing at least one of Ag, Au, Cu, Pd, and Sn at least on the mount surfaces of the terminals. With this configuration, the joining force with a solder or the like increases at the interface. In view of the current path formation in the surface areas in the depth of several tens of μm or less due to the skin effect, which defines a skin depth $\bar{o}$ by a formula of $\bar{o}=(\rho/\pi f \mu)^{1/2}$, where $\rho$ represents a resistivity, f a frequency, and $\mu$ a permeability, it is preferable that the entire surfaces of the anode terminal and the cathode terminal including surfaces parallel to a thickness direction thereof each also be formed with a film containing at least one of Ag, Au, Cu, Pd, and Sn because these surfaces each serve as part of the current path between the anode and the cathode. The terminal cut surfaces at the outer surfaces of the product may not be plated because the density of current distribution is small in these portions which are more remote from the anode body and the cathode layer of the capacitor element and provide a longer path. Secondly, film formation on these portions is not easy in terms of a process.

It is preferable that the anode terminal have a fillet surface and be formed by a lead frame having a concave-convex portion formed by deforming a portion thereof in a direction perpendicular to the mount surface by drawing or coining, wherein the concave-convex portion serves as a concave portion on the mount surface side and as a convex portion on the side opposite to the mount surface and wherein the concave portion is plated and the convex portion is formed with a flat portion that is parallel to the mount surface and serves as a welding margin with respect to the anode lead, and that the cathode terminal have a fillet surface and be formed by a lead frame having a concave portion formed by drawing or coining near a connecting portion with the cathode layer of the capacitor element, wherein the concave portion is plated.

By applying in advance the plating to the concave portions that will serve as the fillet surfaces after the cutting, the process of carrying out the plating after the cutting becomes unnecessary. This also applies to the foregoing dummy terminal such that a plated concave portion is provided in advance and serves as a fillet surface after the cutting.

In accordance with a still another aspect of the invention, a solid electrolytic capacitor with face-down terminals comprises:

a capacitor element having a dielectric, an electrolyte, and a cathode layer formed in the order named on a surface of a porous sintered body made of a valve-action metal and having an anode lead drawn out therefrom;

an anode terminal having one end connected to the anode lead and the other end serving as an anode exposed portion exposed at a mount surface;

a cathode terminal connected to the cathode layer of the capacitor element and having an end serving as a cathode exposed portion exposed at the mount surface; and an insulating casing resin covering the capacitor element, the anode terminal, and the cathode terminal, wherein the anode lead is disposed so as to be offset in a direction substantially perpendicular to an anode lead drawout direction, and wherein at the rectangular mount surface having a first and a second side parallel to each other and forming an outer bottom portion, a pair of two terminal exposed portions are located at the first side and a pair of two terminal exposed portions are located at the second side, and the two terminal exposed portions located at the first side are connected so as to serve as the anode exposed portion of the anode terminal and the cathode exposed portion of the cathode terminal, respectively. The two terminal exposed portions located at the second side may serve as dummy terminals that are not electrically connected to the capacitor element.

The solid electrolytic capacitor with face-down terminals may further comprises another cathode terminal located so as to extend in a direction opposite to the aforementioned cathode terminal, the another cathode terminal connected to the cathode layer of said capacitor element and having an end serving as a cathode exposed portion exposed at the mount surface, wherein one of said two terminal exposed portions located at the second side is connected so as to serve as the cathode exposed portion of said another cathode terminal.

The other of the two terminal exposed portions located at the second side may serves as a dummy terminal that is. not electrically connected to the capacitor element.

The solid electrolytic capacitor with face-down terminals may further comprises:

another anode lead drawn out in a direction opposite to the aforementioned anode lead; and another anode terminal having one end connected to the another anode lead and the other end serving as an anode exposed portion exposed at the mount surface, wherein the other of said two terminal exposed portions located at the second side is connected so as to serve as the anode exposed portion of the another anode terminal.

In this invention, it is possible to reduce the ESR and ESL at the high frequency range by shortening the distance of the current path formed by the anode terminal, the cathode terminal, and the external circuit board. Further, the shapes of the exposed terminals have a completely symmetrical structure and, therefore, when fixing the capacitor to the circuit board, it is possible to suppress position offset of the capacitor and thus there is no problem of failure in appearance or the like.

Further, among the four side surfaces, it is necessary to cut only the two side surfaces by dicing or the like where the terminals should be cut. Accordingly, the remaining two side surfaces are not required to be cut and thus can be defined by a casing resin molding die. Consequently, the number of times of dicing can be reduced and thus it is possible to suppress wear of a dicing saw and reduce the processing time.

That is, according to this invention, the solid electrolytic capacitor with face-down terminals excellent in productivity and reliability and capable of achieving a low ESR and a low ESL at the high frequency range can be provided at a low price.

BRIEF DESCRIPTION OF THE DRAWINGS

FIGS. 1A to 1C show a solid electrolytic capacitor with face-down terminals according to a first embodiment of this invention, wherein FIG. 1A is a front view thereof, FIG. 1B is a right side view thereof, and FIG. 1C is a bottom view thereof;

FIGS. 2A to 2C show the solid electrolytic capacitor with face-down terminals including the inside thereof according to the first embodiment of this invention, wherein FIG. 2A is a top view thereof, FIG. 2B is a front view thereof, and FIG. 2C is a bottom view thereof;

FIGS. 3A and 3B show the solid electrolytic capacitor with face-down terminals including the inside thereof according to the first embodiment of this invention, wherein FIG. 3A is a left side view thereof and FIG. 3B is a right side view thereof;

FIGS. 4A and 4B show the solid electrolytic capacitor with face-down terminals according to the first embodiment of this invention, wherein FIG. 4A is a bottom view thereof and FIG. 4B is a diagram showing the bottom surface of the capacitor, before cutting, fabricated on a lead frame;

FIGS. 5A to 5C show a solid electrolytic capacitor with face-down terminals including the inside thereof according to a second embodiment of this invention, wherein FIG. 5A is a top view thereof, FIG. 5B is a front view thereof, and FIG. 5C is a bottom view thereof;

FIGS. 6A and 6B show the solid electrolytic capacitor with face-down terminals including the inside thereof according to the second embodiment of this invention, wherein FIG. 6A is a left side view thereof and FIG. 6B is a right side view thereof;

FIGS. 7A to 7C show a solid electrolytic capacitor with face-down terminals including the inside thereof according to a third embodiment of this invention, wherein FIG. 7A is a top view thereof, FIG. 7B is a front view thereof, and FIG. 7C is a bottom view thereof;

FIGS. 8A and 8B show the solid electrolytic capacitor with face-down terminals including the inside thereof according to the third embodiment of this invention, wherein FIG. 8A is a left side view thereof and FIG. 8B is a right side view thereof;

FIGS. 9A to 9C show a solid electrolytic capacitor with face-down terminals according to a fourth embodiment of this invention, wherein FIG. 9A is a front view thereof, FIG. 9B is a right side view thereof, and FIG. 9C is a bottom view thereof;

FIGS. 10A and 10B show the solid electrolytic capacitor with face-down terminals according to the fourth embodiment of this invention, wherein FIG. 10A is a bottom view of the capacitor including the inside thereof and FIG. 10B is a diagram showing the bottom surface of the capacitor on a lead frame before cutting;

FIGS. 12A and 12B show a solid electrolytic capacitor with face-down terminals according to prior art 2, wherein FIG. 12A is a longitudinal sectional view of the capacitor alone and FIG. 12B is a longitudinal sectional view in which the capacitor is mounted on a circuit board;

FIGS. 13A to 13C show a solid electrolytic capacitor with face-down terminals according to prior art 3, wherein FIG. 13A is a front view thereof, FIG. 13B is a bottom view thereof, and FIG. 13C is a right side view thereof.

DESCRIPTION OF THE PREFERRED EMBODIMENTS

Figure 1A:
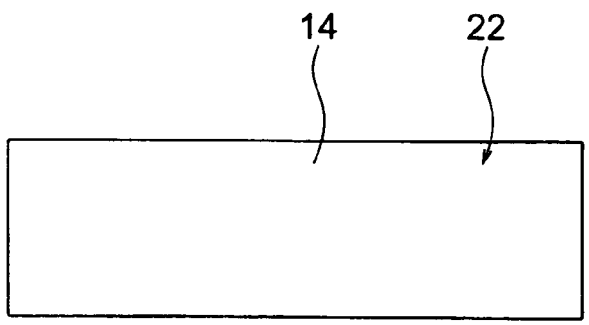
Figure 1B:
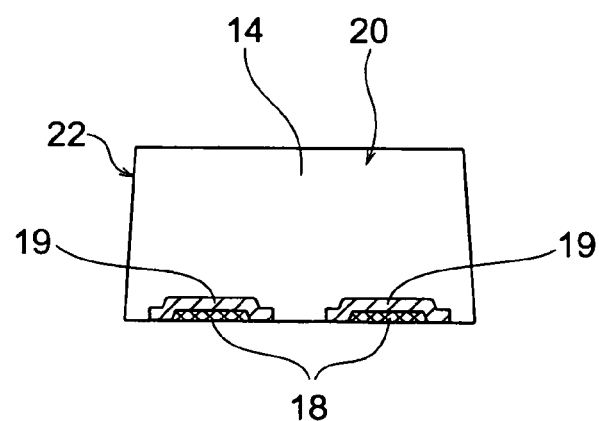
Figure 1C:
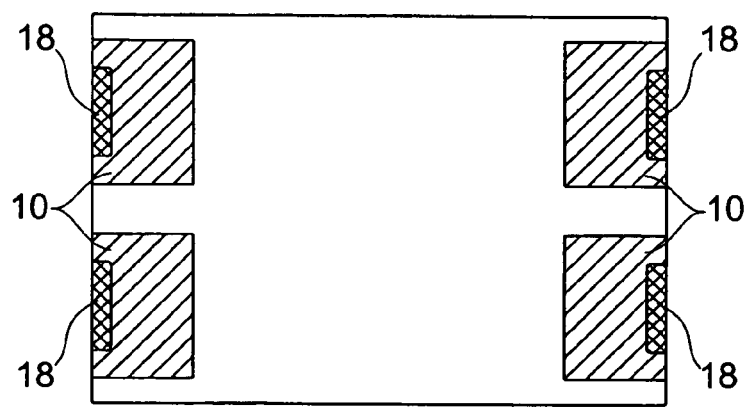
Figure 2A:
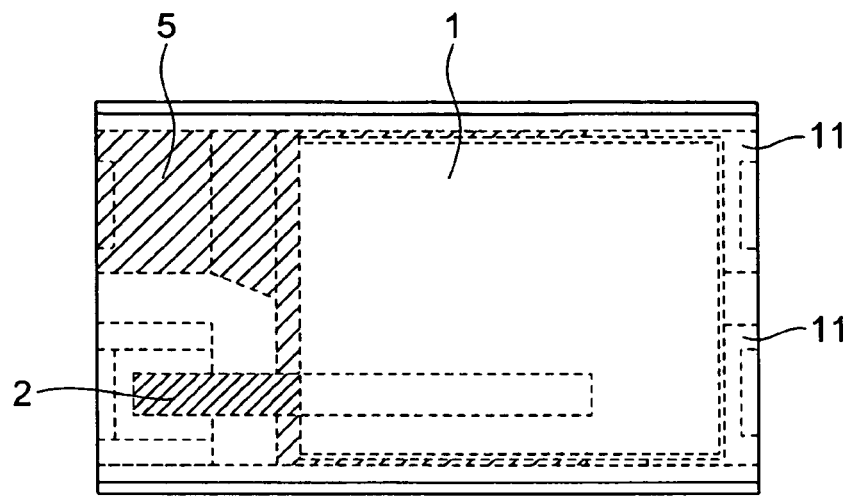
Figure 2B:
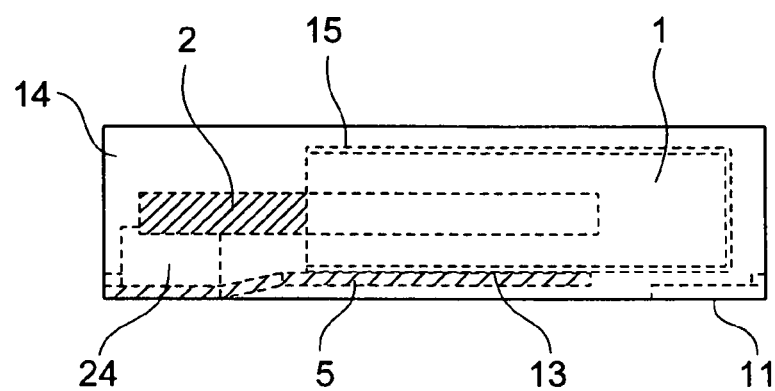
Figure 2C:
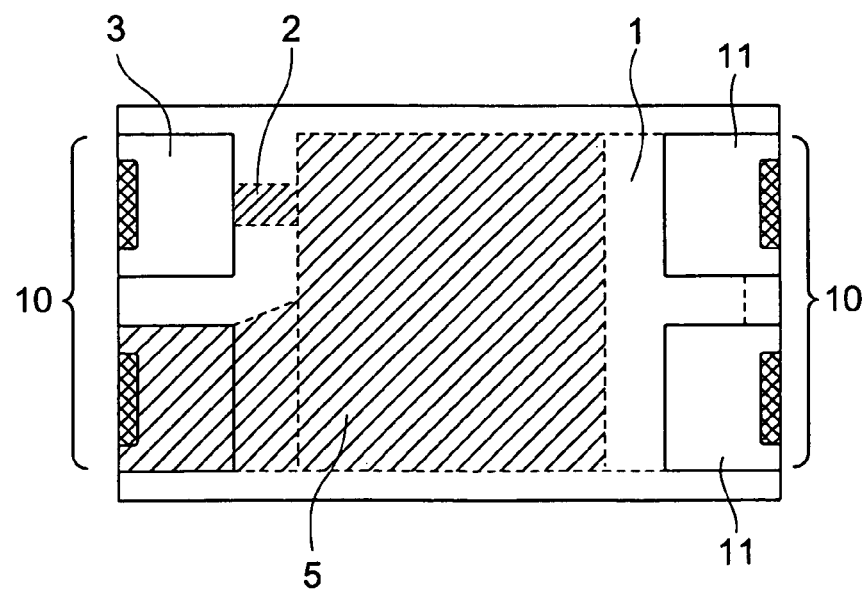
Figure 3A:
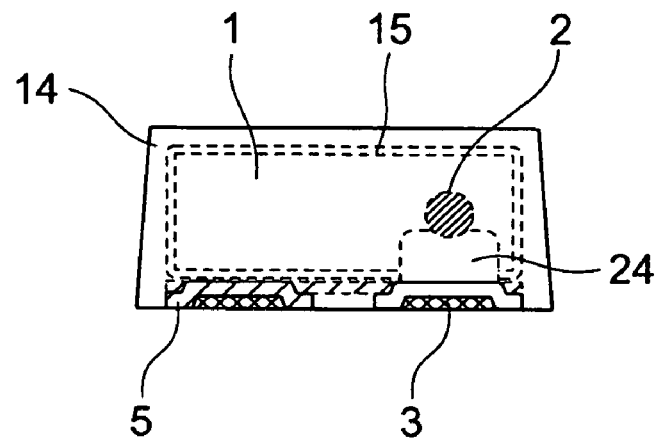
Figure 3B:
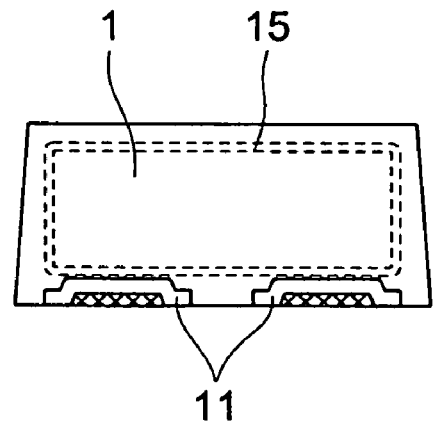
Figure 4A:
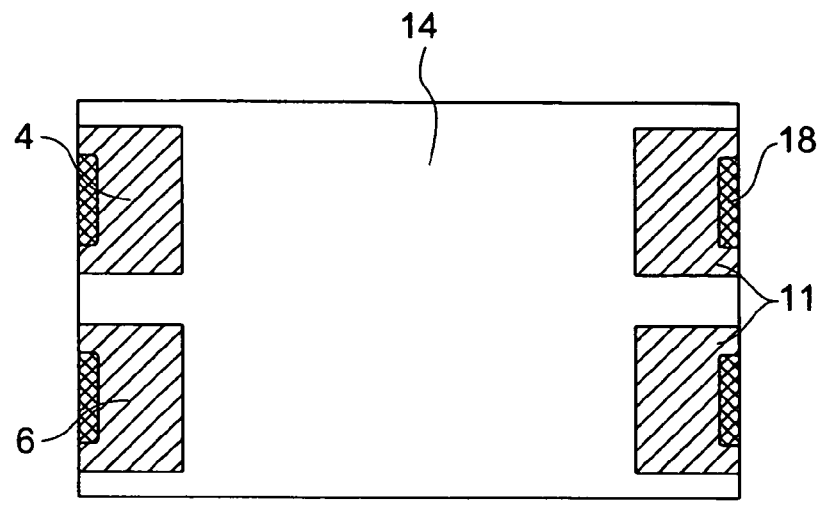
Figure 4B:
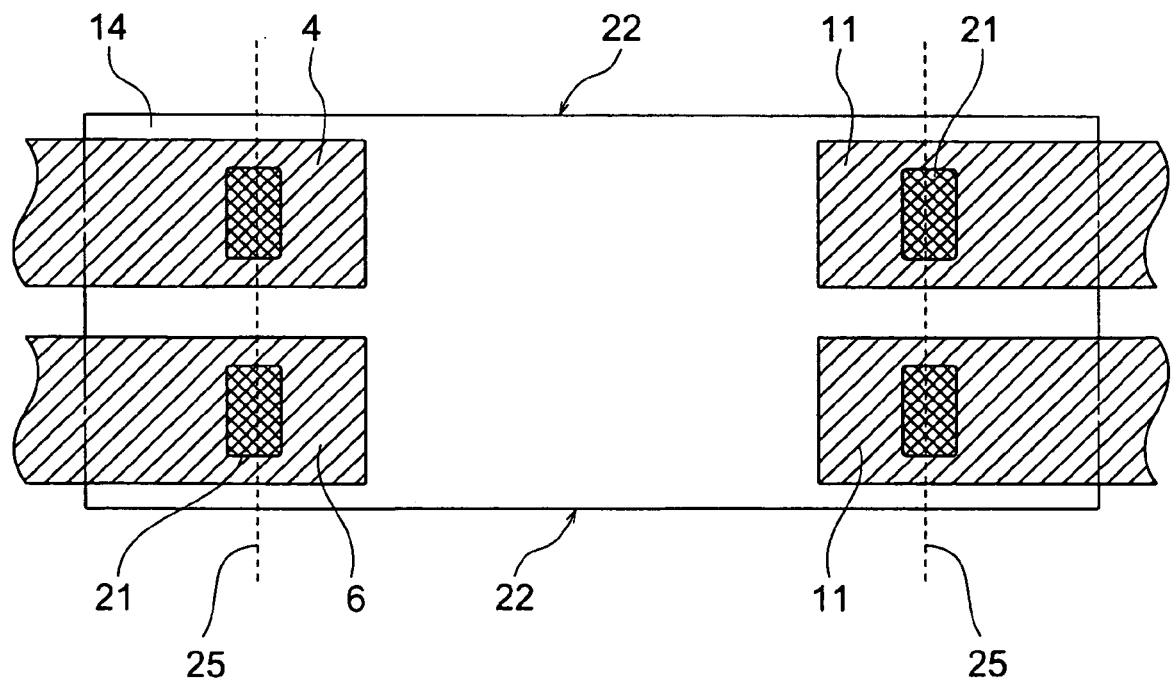

Now, a solid electrolytic capacitor with face-down terminals according to a first embodiment of this invention will be described with reference to the drawings. FIGS. 1A to 1C, FIGS. 2A to 2C, FIGS. 3A and 3B, and FIGS. 4A and 4B show the solid electrolytic capacitor with face-down terminals of this invention. FIG. 1A is a front view of the capacitor, FIG. 1B is a right side view thereof, and FIG. 1C is a bottom view thereof. FIG. 2A is a top view showing the capacitor including the inside thereof, FIG. 2B is a front view of the capacitor including the inside thereof, and FIG. 2C is a bottom view of the capacitor including the inside thereof. FIG. 3A is a left side view of the capacitor and FIG. 3B is a right side view thereof. FIG. 4A is a bottom view of the capacitor and FIG. 4B is a diagram showing the bottom surface of the capacitor, before cutting, fabricated on a lead frame. In the figures, marking such as hatching represents a difference in material or surface condition.

The appearance of the solid electrolytic capacitor with face-down terminals of this first embodiment will be described with reference to FIGS. 1A to 1C. When the capacitor is illustrated while its one side parallel to a draw-out direction of an anode lead of a capacitor element is oriented toward the front, the appearance of the capacitor becomes as shown in FIG. 1A wherein there appears a casing resin molding die defining surface 22 of a casing resin 14. Further, as shown in FIG. 1B, a casing resin cut surface 20, two terminal cut surfaces 19, and two fillet surfaces 18 appear on the right side of the capacitor. A left side view of the capacitor is omitted since it is the same as the right side view. Further, as shown in FIG. 1C, four terminal exposed portions are provided on the board mount side such that a terminal pair 10 is formed by the most adjacent two terminals and this terminal pair 10 is formed at each of two sides, substantially perpendicular to the draw-out direction of the anode lead, of a rectangular mount surface of the capacitor. In this manner, the four terminal exposed portions are provided symmetrically with respect to two center lines of the rectangular mount surface.

Now, based on a specific solid electrolytic capacitor fabrication example, the first embodiment of this invention will be described in detail. Since a capacitor element 1 is fabricated by a known technique, description will be briefly made of a case where tantalum is used as a valve-action metal. At first, tantalum metal powder is formed into a compact by a press machine with a tantalum lead, which will serve as an anode lead (anode draw-out lead) 2, partly embedded in the compact. The compact is then sintered in a high vacuum at a high temperature. In the capacitor element of this invention, as shown in FIGS. 2A to 2C, the tantalum lead (anode lead 2) is drawn out at a position offset from a center line of the capacitor element 1 in a direction perpendicular to the draw-out direction of the anode lead 2. Then, a $Ta_2O_5$ film is formed on the surface of the sintered compact. After immersed in a manganese nitrate solution, the compact with the $Ta_2O_5$ film is subjected to thermal decomposition to form $MnO_2$. Subsequently, a cathode layer 15 is formed by graphite and Ag, thereby obtaining the capacitor element 1. If a conductive high polymer such as polythiophene or polypyrrole is used instead of $MnO_2$, it becomes easy to achieve a low ESR with the single capacitor element. Instead of tantalum, niobium, aluminum, titanium, or the like may be used as a valve-action metal. Further, the same effect can be achieved using a foil instead of the sintered body.

As shown in FIGS. 2A to 2C, the anode lead 2 offset in the direction perpendicular to the anode lead draw-out direction is connected by laser welding or resistance welding to a convex portion 24 of an anode terminal 3 disposed at a position offset from a center line of the capacitor, then a cathode terminal 5 is connected to the cathode layer 15 by the use of a conductive adhesive 13 containing silver, then the capacitor element 1 is overmolded with the casing resin 14 by transfer mold, and then cutting is carried out at two surfaces, which will serve as side surfaces of a product, along cutting positions 25 (see FIG. 4B) by dicing or the like, thereby obtaining the solid electrolytic capacitor with face-down terminals according to this first embodiment. The cathode terminal 5 has a size covering most of a bottom surface of the cathode layer 15 crossing from an upper side to a lower side and extends in the direction of the anode lead 2 offset from the center line of the capacitor.

This solid electrolytic capacitor is configured such that, in one of the terminal pairs 10 each formed by the most adjacent two terminals among the terminals at four positions that are exposed from the casing resin 14, one of the terminals serves as an anode exposed portion of the anode terminal 3, while the other terminal serves as a cathode exposed portion of the cathode terminal 5 and further such that, in the other terminal pair 10 located on the opposite side, both terminals serve as dummy terminals (nonpolar terminals) 11 that are not electrically connected to the capacitor element 1.

As shown in FIGS. 4A and 4B, when the terminals at four positions exposed from the casing resin 14 are cut at the cutting positions 25, concave portions 21 are also cut and part of each of the concave portions 21 remaining on the side of the solid electrolytic capacitor with face-down terminals serves as the fillet surface 18. The number of the fillet surfaces 18 is four in total. As shown in FIGS. 1A to 1C, the terminal cut surfaces 19 and the casing resin cut surface 20 are formed at each of the two side surfaces where the fillet surfaces 18 are formed and two surfaces each perpendicular to these side surfaces are the casing resin molding die defining surfaces 22.

When the state of terminal electrical connection is seen from the anode lead draw-out direction, the terminal exposed portions of the anode terminal 3 and the cathode terminal 5 are connected to the capacitor element 1 as shown in FIG. 3A, while, the dummy terminals 11 are not electrically connected to the capacitor element 1 as shown in FIG. 3B.

Figure 5A:
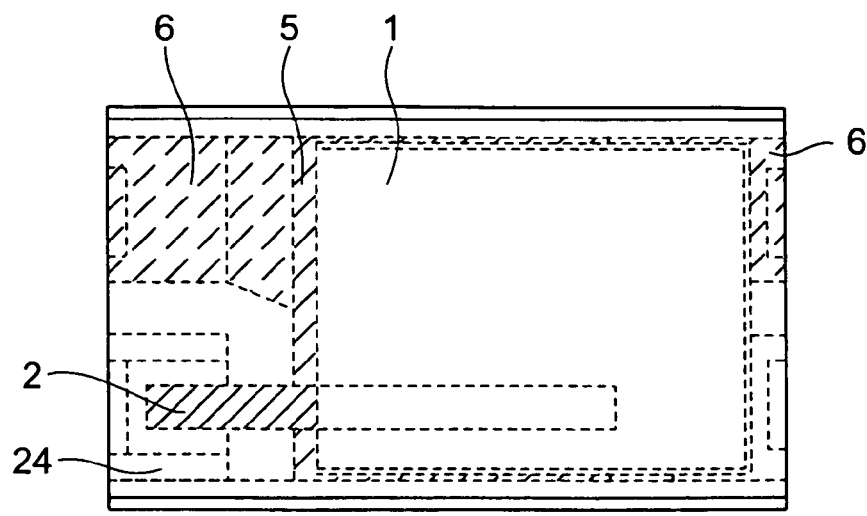
Figure 5B:
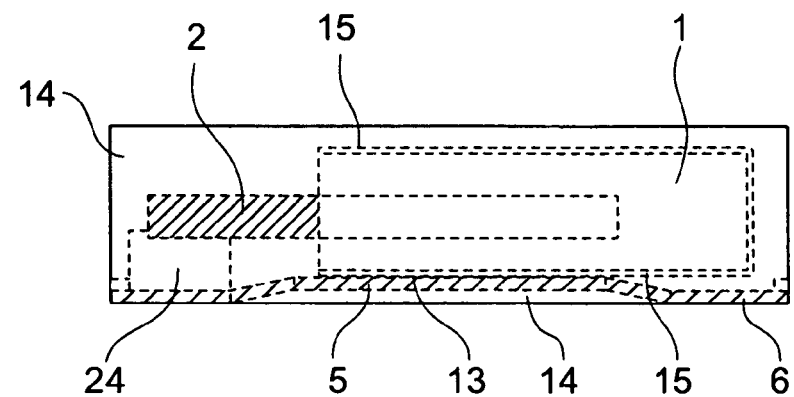
Figure 5C:
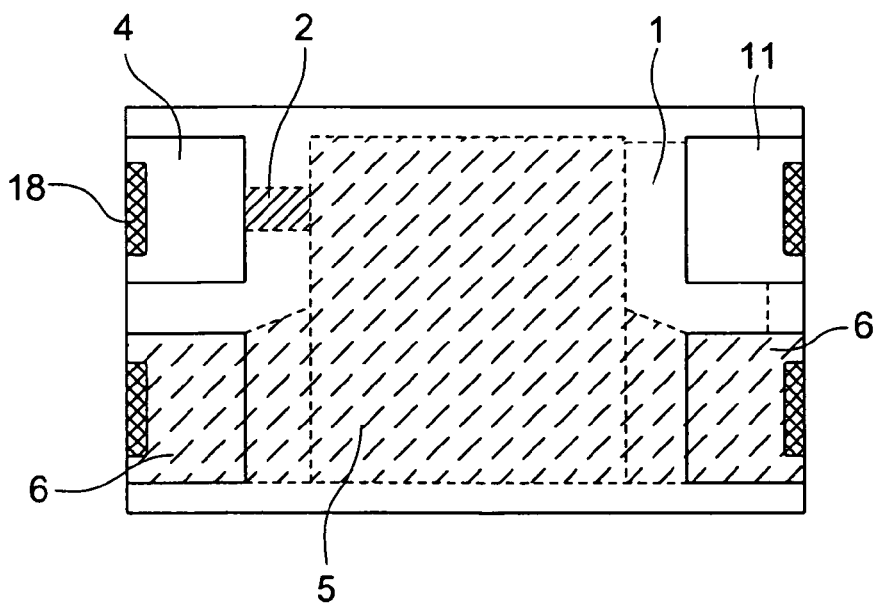
Figure 6A:
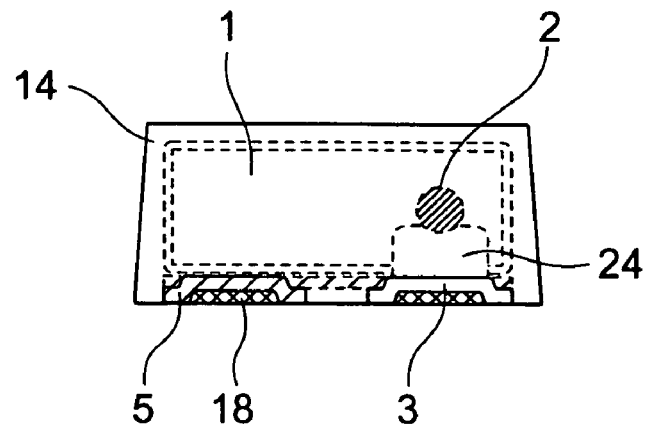
Figure 6B:
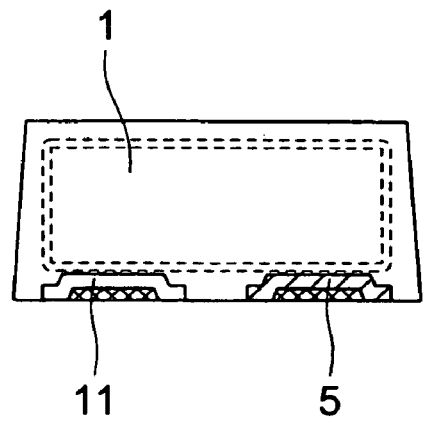

Now, a second embodiment of this invention will be described. FIGS. 5A to 5C and FIGS. 6A and 6B show a solid electrolytic capacitor with face-down terminals including the inside thereof according to this second embodiment, wherein FIGS. 5A, 5B, and 5C are a top view, a front view, and a bottom view, respectively, and FIGS. 6A and 6B are a left side view and a right side view, respectively. In the figures, marking such as hatching represents a difference in material or surface condition.

As shown in FIGS. 5A to 5C and FIGS. 6A and 6B, the solid electrolytic capacitor is configured such that, in one of terminal pairs each formed by the most adjacent two terminals among terminals at four positions that are exposed from a casing resin 14, one of the terminals serves as an anode exposed portion 4, while the other terminal serves as a cathode exposed portion 6 and further such that, in the other terminal pair located on the opposite side, one of the terminals serves as a cathode exposed portion 6, while the other terminal serves as a dummy terminal (nonpolar terminal) 11.

When an anode lead 2 offset in a direction perpendicular to an anode lead draw-out direction is laser-welded or resistance-welded to a convex portion 24 of an anode terminal 3 as shown in FIGS. 5A and 5B, variation normally occurs in a height direction, thus resulting in occurrence of variation in position of a capacitor element 1 in the height direction. When the capacitor element 1 is welded at a position lower than a design value, there is a possibility of occurrence of failure in appearance such that a cathode terminal 5 located in the casing resin 14 is pushed down by the capacitor element 1 and thus the cathode terminal 5, which should be located in the casing resin 14, is exposed at the mount surface. However, by employing the shape of this second embodiment, the cathode terminal 5 is supported on both sides and thus the cathode terminal strength is increased with respect to vertical directions, so that there is no possibility that the cathode terminal 5 located in the casing resin 14 is exposed at the mount surface after the welding. A center portion of the cathode terminal 5 is connected to a cathode layer 15 by a conductive adhesive 13 and an outer concave portion at the center portion of the cathode terminal 5 is filled with the casing resin 14.

Figure 7A:
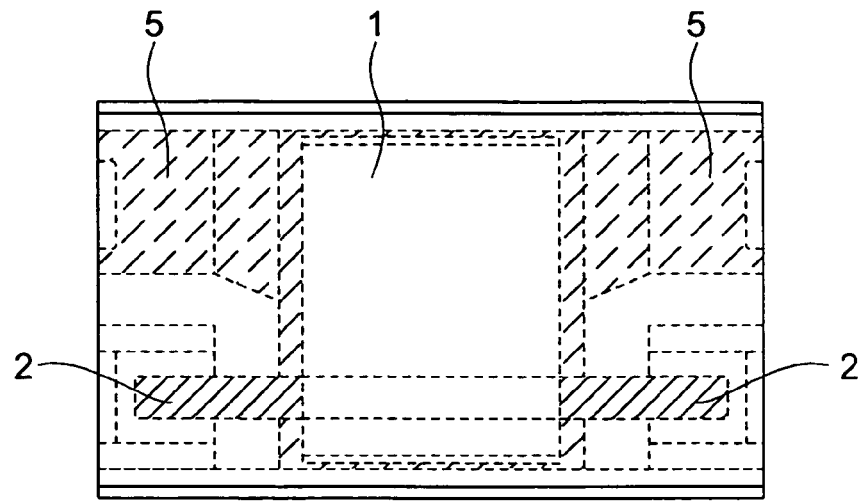
Figure 7B:
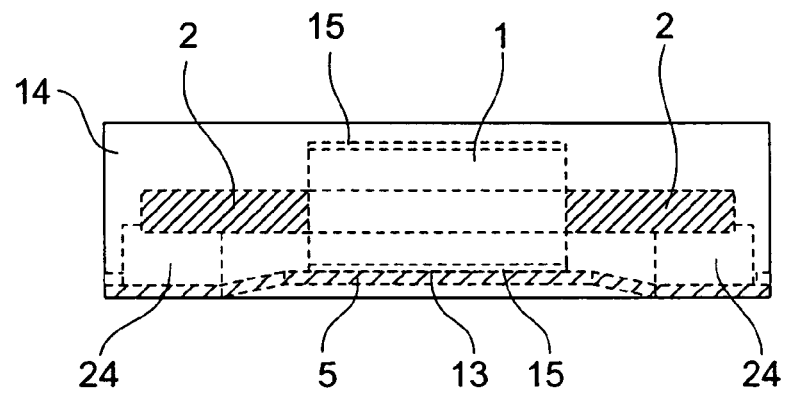
Figure 7C:
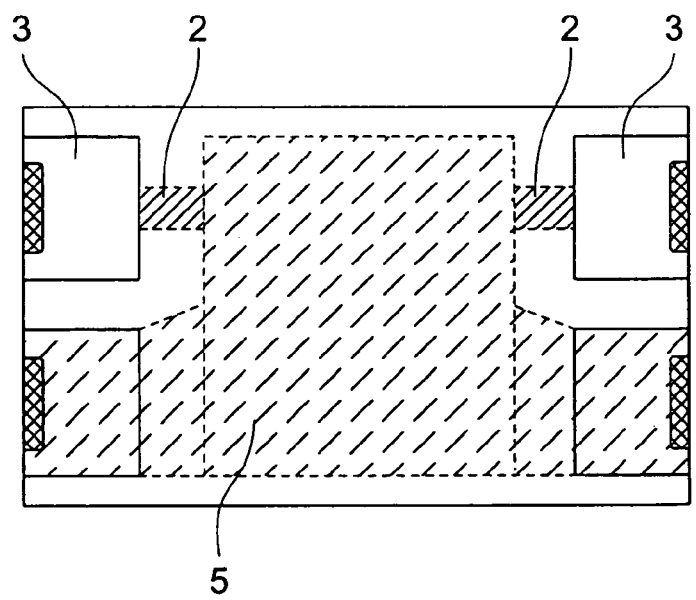
Figure 8A:
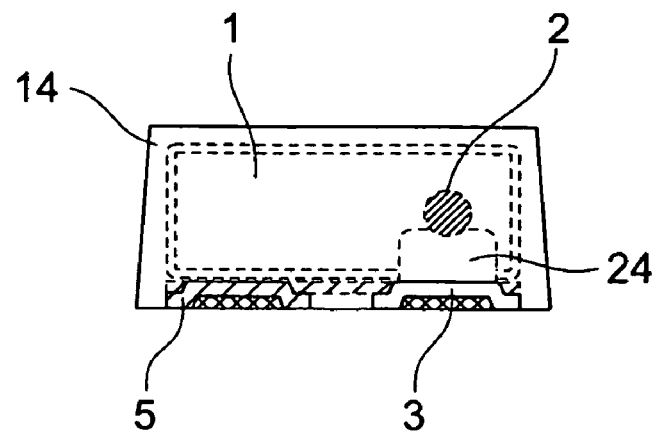
Figure 8B:
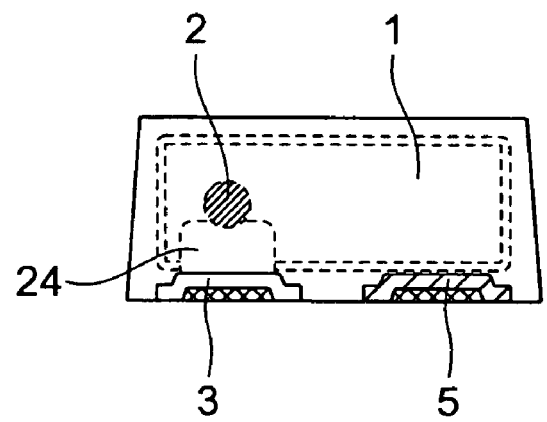

Now, a third embodiment of this invention will be described. FIGS. 7A to 7C and FIGS. 8A and 8B show a solid electrolytic capacitor with face-down terminals including the inside thereof according to this third embodiment, wherein FIGS. 7A, 7B, and 7C are a top view, a front view, and a bottom view, respectively, and FIGS. 8A and 8B are a left side view and a right side view, respectively. In the figures, marking such as hatching represents a difference in material or surface condition.

As shown in FIGS. 7A to 7C and FIGS. 8A and 8B, the solid electrolytic capacitor is configured such that an anode lead 2 offset in a direction perpendicular to an anode lead draw-out direction from a capacitor element 1 is drawn out from both sides of an anode body, i.e. not from only one side thereof. By employing this shape, two terminal pairs each formed by the most adjacent two terminals have the same anode and cathode polarity. Therefore, in designing a circuit board, it is possible to carry out a design with a higher degree of freedom such that (1) the circuit path from circuit board lands uses only one pair of the terminals on the right or left side or (2) the circuit path from circuit board lands uses both pairs of the terminals.

Figure 9A:
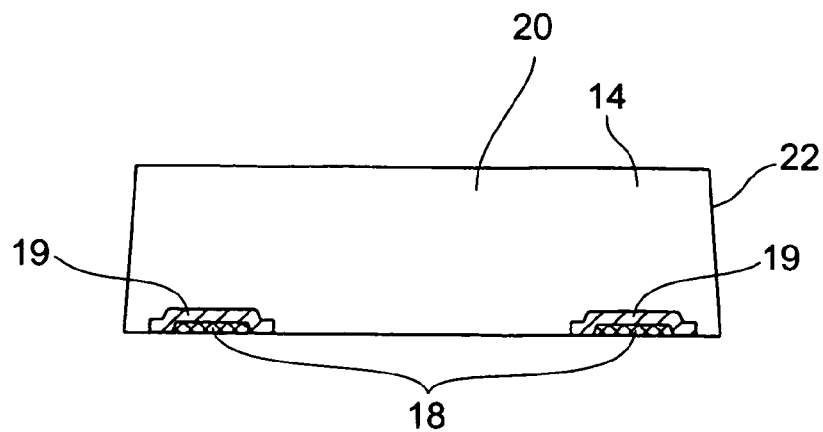
Figure 9B:
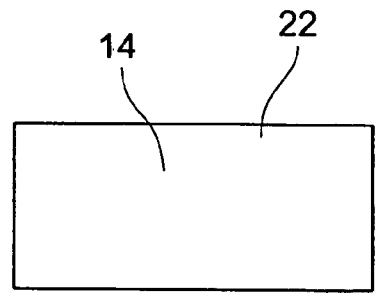
Figure 9C:
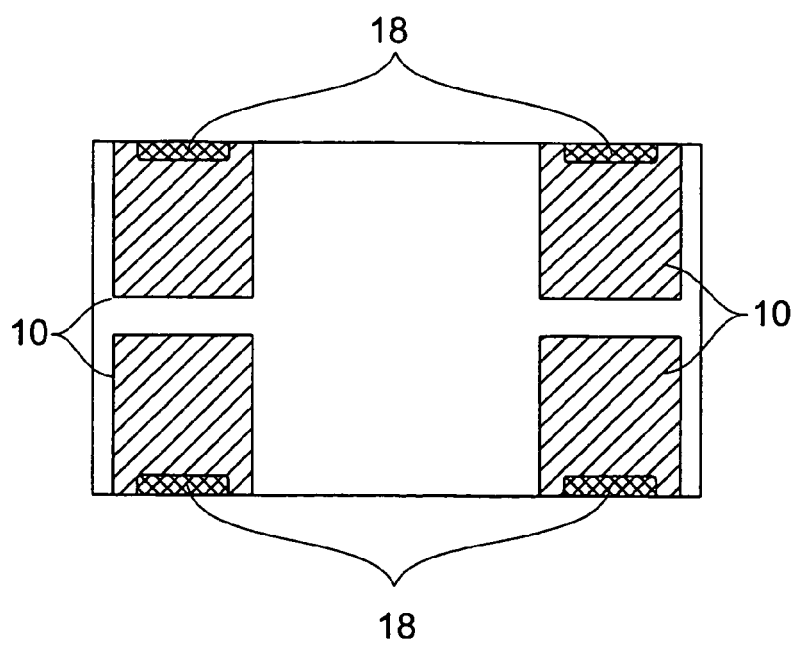
Figure 10A:
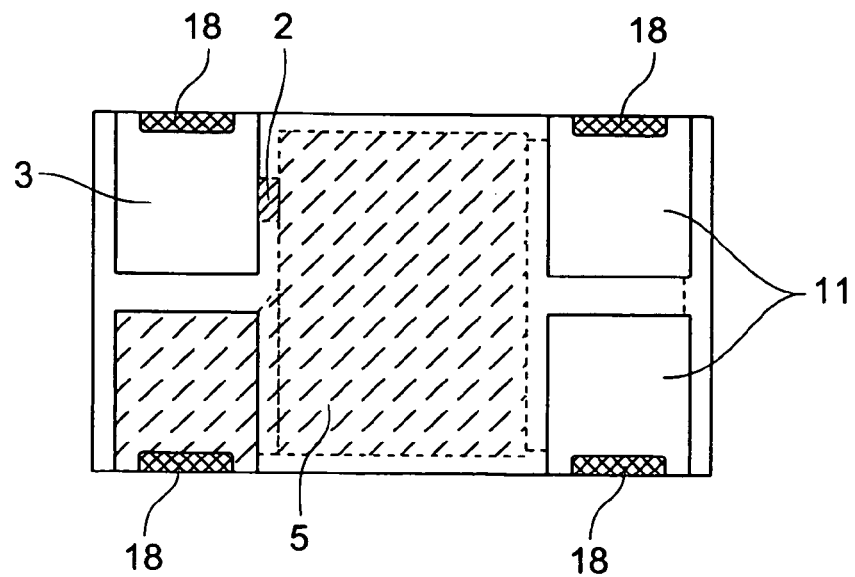
Figure 10B:
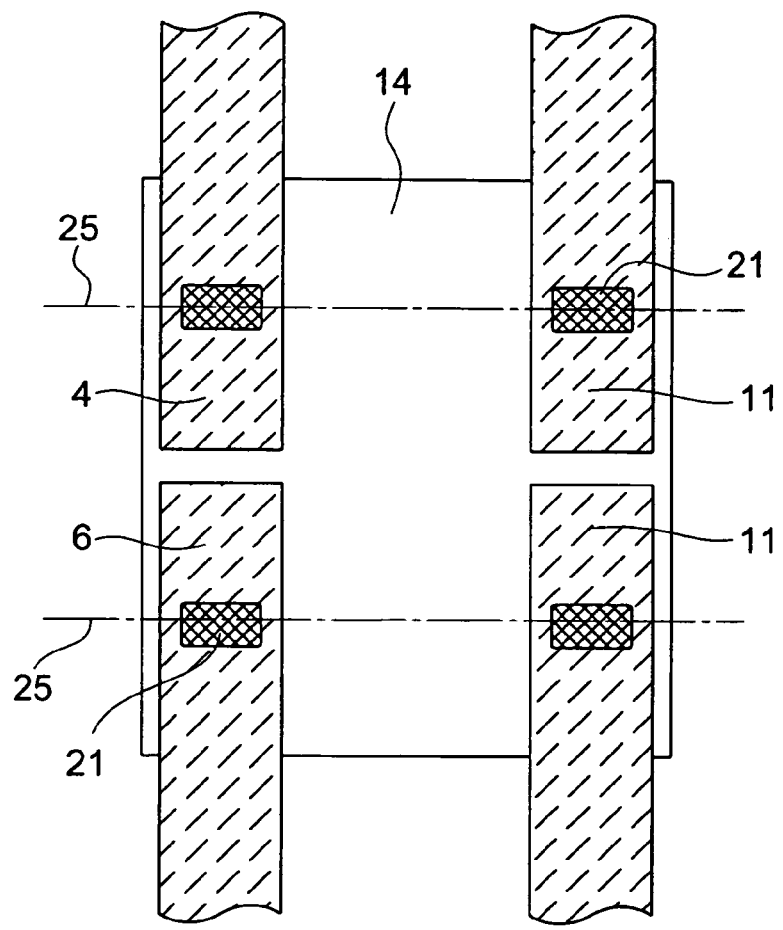
Figure 11:
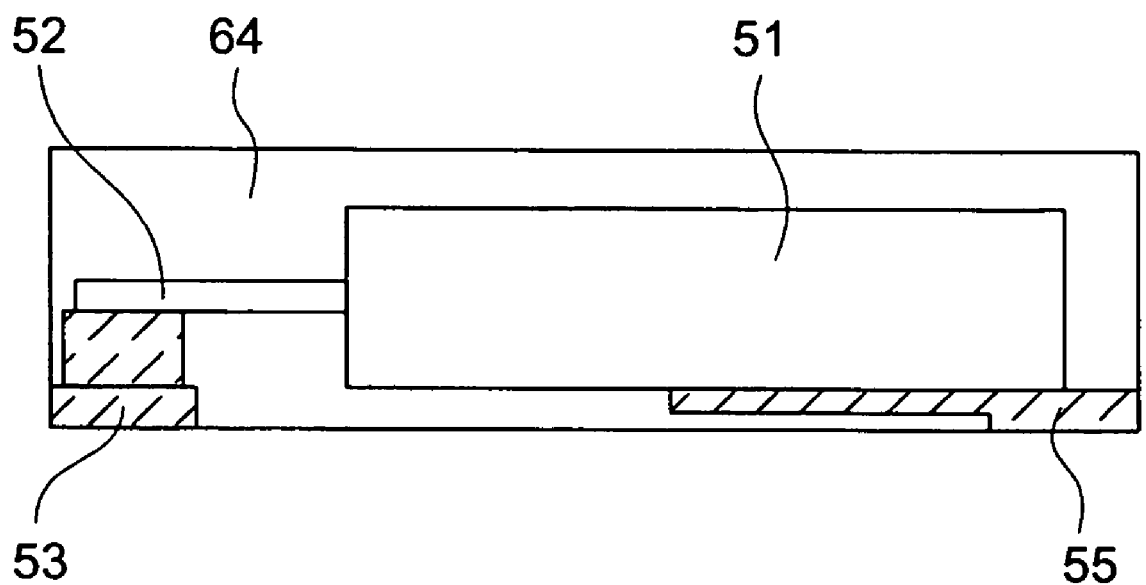
FIG. 11 is a longitudinal sectional view showing a solid electrolytic capacitor with face-down terminals according to prior art 1.
Figure 12A:
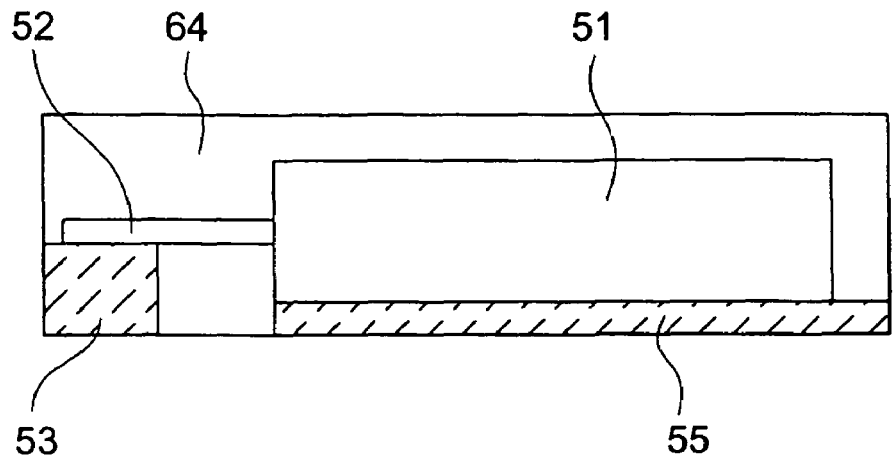
Figure 12B:
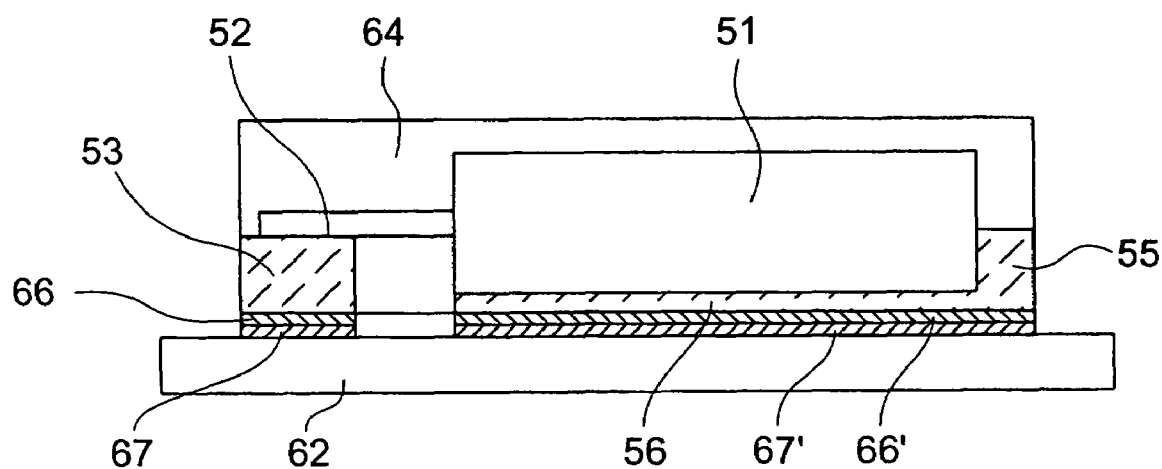
Figure 13A:
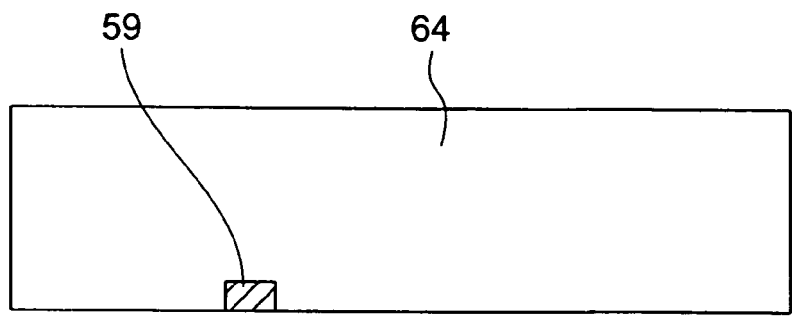
Figure 13B:
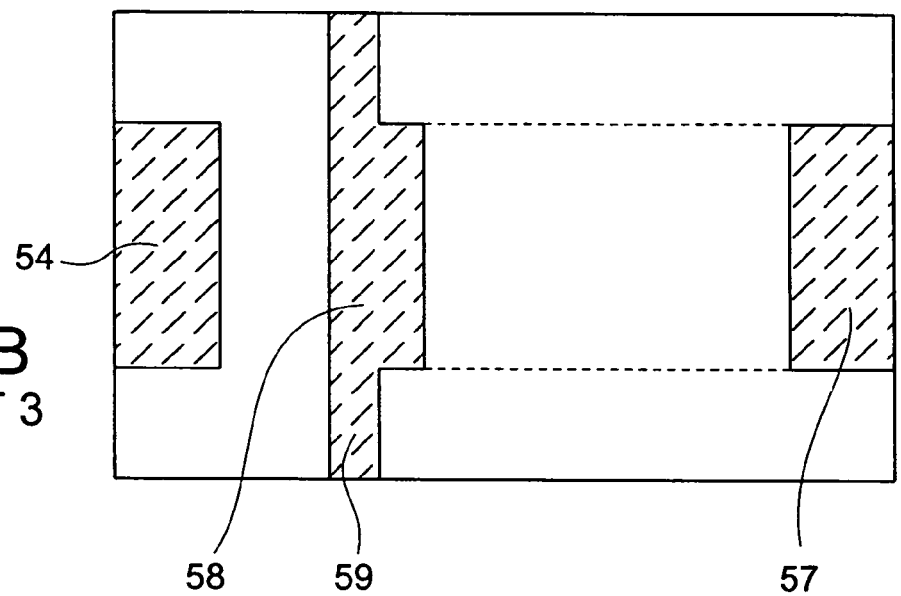
Figure 13C:
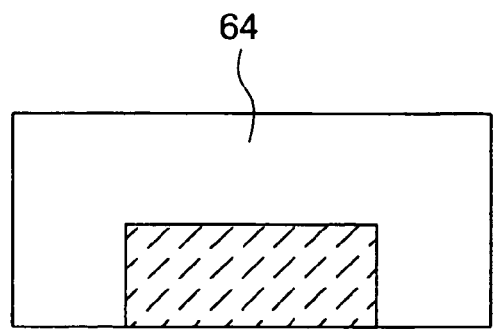
Figure 14:
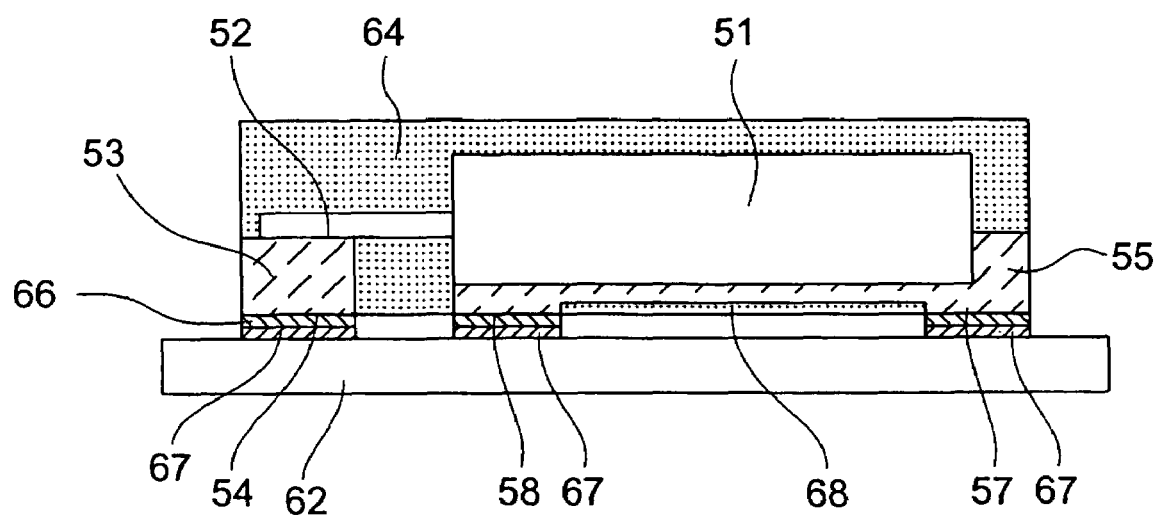
FIG. 14 is a longitudinal sectional view showing the state where the solid electrolytic capacitor with face-down terminals according to prior art 3 is mounted on a circuit board.

Now, a fourth embodiment of this invention will be described. FIGS. 9A to 9C and FIGS. 10A and 10B show a solid electrolytic capacitor with face-down terminals according to this fourth embodiment, wherein FIG. 9A is a front view thereof, FIG. 9B is a right side view thereof, FIG. 9C is a bottom view thereof, FIG. 10A is a bottom view of the capacitor including the inside thereof, and FIG. 10B is a diagram showing the bottom surface of the capacitor on a lead frame before cutting. In the figures, marking such as hatching represents a difference in material or surface condition.

The fourth embodiment of this invention is a modification based on the foregoing first embodiment. In this fourth embodiment, the positions of two terminal pairs that are exposed after carrying out overmolding with a casing resin and cutting at cutting positions 25 appear at outer side surfaces of a product in a direction perpendicular to that in the foregoing first to third embodiments. That is, in FIGS. 9A to 9C, cut surfaces and fillet surfaces are formed on the front and back sides. Even with this structure, the same effect can be achieved.

When terminals at four positions exposed from a casing resin 14 are cut at the cutting positions 25 as shown in FIG. 10B, concave portions 21 are also cut and part of each of the concave portions 21 remaining on the side of the solid electrolytic capacitor with face-down terminals serves as a fillet surface 18. The number of the fillet surfaces 18 is four in total. Terminal cut surfaces 19 and a casing resin cut surface 20 are formed at each of the two side surfaces where the fillet surfaces 18 are formed and two surfaces each perpendicular to these side surfaces are casing resin molding die defining surfaces 22.

In this fourth embodiment, the positions of terminal pairs 10 at the mount surface are the same as those in the first embodiment, while, the product outer side surfaces formed by cutting and having the fillet surfaces 18 and the casing resin molding die defining surfaces are switched as compared with the first embodiment.

The surfaces of the anode terminal 3 and the cathode terminal 5 are each formed with a film containing at least one of Ag, Au, Cu, Pd, and Sn at least on the mount surfaces of the terminals, thereby increasing a joining force with a solder or the like at the interface. In view of the current path confinement to the surface areas in the depth of several tens of μm or less due to the skin effect at a high frequency range, it is preferable that the entire surfaces of the anode terminal 3 and the cathode terminal 5 including surfaces parallel to a thickness direction thereof each also be formed with a film containing at least one of Ag, Au, Cu, Pd, and Sn because these surfaces each serve as part of the current path between the anode and the cathode. Au plating is best suited because of low resistivity.

More definitely, it is effective to form such films on the surfaces parallel to a vertical direction in the figure (the surfaces perpendicular to the mount surface) since the surfaces without such films appear when the lead frame is cut to complete the shapes of the anode terminal 3 and the cathode terminal 5.

In the foregoing embodiments, the description has been made of the case where the anode lead is welded to the anode terminal by the use of the block-shaped convex portion 24 as best shown in FIG. 2B. However, in this invention, what is important is where to form the terminal exposed portions at the outer surfaces and, by defining those positions, the ESR and ESL are reduced. The connection structure between the cathode layer and the cathode terminal is also not limited to the foregoing embodiments. For example, a solid electrolytic capacitor with face-down terminals may be fabricated such that an anode terminal is formed with a concave-convex portion by deforming a portion thereof in a direction perpendicular to the mount surface by drawing or coining, wherein the concave-convex portion serves as a concave portion on the mount surface side and as a convex portion on the side opposite to the mount surface and wherein the concave portion is plated and the convex portion is formed with a flat portion that is parallel to the mount surface and serves as a welding margin, and a cathode terminal connected to a cathode layer of a capacitor element by a conductive adhesive is formed, at a portion that is cut by dicing or the like to serve as an outer surface, with a concave portion by drawing or coining, wherein this concave portion is plated.

While the embodiments of this invention have been described, this invention is not to be limited thereto. Even if there are design changes in the range without departing from the gist of this invention, those changes are included in this invention. That is, this invention naturally includes various changes and modifications that can presumably be achieved by a person skilled in the art.

What is claimed is:

1. A solid electrolytic capacitor with face-down terminals comprising a capacitor element having a dielectric, an electrolyte, and a cathode layer formed in order on a surface of a porous sintered body made of a valve-action metal and having an anode lead drawn out therefrom so as to be offset in a direction substantially perpendicular to an anode lead draw-out direction, an anode terminal having one end connected to said anode lead and the other end serving as an anode exposed portion exposed at a mount surface, a cathode terminal connected to said cathode layer of said capacitor element and having an end serving as a cathode exposed portion exposed at the mount surface, and an insulating casing resin covering said capacitor element, said anode terminal, and said cathode terminal, wherein the mount surface includes an outer bottom portion, a first and a second side parallel to each other, and four terminal exposed portions which are provided such that a pair of the two terminal exposed portions are located at said first side and a pair of the other two terminal exposed portions are located at said second side, and wherein said two terminal exposed portions located at said first side serve as said anode exposed portion of said anode terminal and said cathode exposed portion of said cathode terminal, respectively, and said two terminal exposed portions located at said second side serve as dummy terminals that are not electrically connected to said capacitor element.

2. A solid electrolytic capacitor with face-down terminals comprising a capacitor element having a dielectric, an electrolyte, and a cathode layer formed in order on a surface of a porous sintered body made of a valve-action metal and having an anode lead drawn out therefrom so as to be offset in a direction substantially perpendicular to an anode lead draw-out direction, an anode terminal having one end connected to said anode lead and the other end serving as an anode exposed portion exposed at a mount surface, a cathode terminal connected to said cathode layer of said capacitor element and having both ends serving as cathode exposed portions exposed at the mount surface, and an insulating casing resin covering said capacitor element, said anode terminal, and said cathode terminal, wherein the mount surface includes an outer bottom portion, a first and a second side parallel to each other, and four terminal exposed portions which are provided such that a pair of the two terminal exposed portions are located at said first side and a pair of the other two terminal exposed portions are located at said second side, and wherein said two terminal exposed portions located at said first side serve as said anode exposed portion of said anode terminal and one of said cathode exposed portions of said cathode terminal, respectively, one of said two terminal exposed portions located at said second side serves as the other of said cathode exposed portions of said cathode terminal, and the other of said two terminal exposed portions located at said second side serves as a dummy terminal that is not electrically connected to said capacitor element.

3. A solid electrolytic capacitor with face-down terminals comprising a capacitor element having a dielectric, an electrolyte, and a cathode layer formed in order on a surface of a porous sintered body made of a valve-action metal and having an anode lead drawn out therefrom so as to be offset in a direction substantially perpendicular to an anode lead draw-out direction, two anode terminals each having one end connected to said anode lead and the other end serving as an anode exposed portion exposed at a mount surface, a cathode terminal connected to said cathode layer of said capacitor element and having both ends serving as cathode exposed portions exposed at the mount surface, and an insulating casing resin covering said capacitor element, said anode terminal, and said cathode terminal, wherein said anode lead is drawn out on both sides of said capacitor element and connected to said two anode terminals, wherein the mount surface includes an outer bottom portion, a first and a second side parallel to each other, and four terminal exposed portions which are provided such that a pair of the two terminal exposed portions are located at said first side and a pair of the other two terminal exposed portions are located at said second side, and wherein, in each of said pairs, one of said two terminal exposed portions serves as one of said anode exposed portions of said anode terminals and the other of said two terminal exposed portions serves as one of said cathode exposed portions of said cathode terminal.

4. A solid electrolytic capacitor with face-down terminals according to any one of claims 1 to 3, wherein said solid electrolytic capacitor with face-down terminals is formed by, after overmolding said capacitor element on a lead frame with said casing resin, cutting said lead frame and said casing resin in a direction perpendicular to said first or second side.

5. A solid electrolytic capacitor with face-down terminals according to any one of claims 1 to 3, wherein said anode terminal and said cathode terminal are each formed with a film containing at least one of Ag, Au, Cu, Pd, and Sn.

6. A solid electrolytic capacitor with face-down terminals according to claim 5, wherein, except terminal cut surfaces at an outer surface of a product, surfaces of said anode terminal and said cathode terminal parallel to a thickness direction thereof are each formed with a film containing at least one of Ag, Au, Cu, Pd, and Sn.

7. A solid electrolytic capacitor with face-down terminals according to any one of claims 1 to 3, wherein said anode terminal has a fillet surface and is formed by a lead frame having a concave-convex portion formed by deforming a portion thereof in a direction perpendicular to the mount surface by drawing or coining, wherein said concave-convex portion serves as a concave portion on a mount surface side and as a convex portion on a side opposite to the mount surface, wherein said concave portion is plated and said convex portion is formed with a flat portion that is parallel to the mount surface and serves as a welding margin with respect to said anode lead, and wherein said cathode terminal has a fillet surface and is formed by a lead frame having a concave portion formed by drawing or coining near a connecting portion with said cathode layer of said capacitor element, said concave portion being plated.

8. A solid electrolytic capacitor with face-down terminals comprising:

a capacitor element having a dielectric, an electrolyte, and a cathode layer formed in order on a surface of a porous sintered body made of a valve-action metal and having an anode lead drawn out therefrom;

an anode terminal having one end connected to said anode lead and the other end serving as an anode exposed portion exposed at a mount surface;

a cathode terminal connected to said cathode layer of said capacitor element and having an end serving as a cathode exposed portion exposed at the mount surface; and an insulating casing resin covering said capacitor element, said anode terminal, and said cathode terminal, wherein said anode lead is disposed so as to be offset in a direction substantially perpendicular to an anode lead draw-out direction, wherein the mount surface includes an outer bottom portion, a first and a second side parallel to each other, a pair of two terminal exposed portions located at said first side, and a pair of two terminal exposed portions located at said second side, and wherein said two terminal exposed portions located at said first side are connected so as to serve as said anode exposed portion of said anode terminal and said cathode exposed portion of said cathode terminal, respectively.

9. A solid electrolytic capacitor with face-down terminals according to claim 8, wherein said two terminal exposed portions located at said second side serve as dummy terminals that are not electrically connected to said capacitor element.

10. A solid electrolytic capacitor with face-down terminals according to claim 8, further comprising another cathode terminal located so as to extend in a direction opposite to the aforementioned cathode terminal, said another cathode terminal connected to said cathode layer of said capacitor element and having an end serving as a cathode exposed portion exposed at the mount surface, wherein one of said two terminal exposed portions located at said second side is connected so as to serve as said cathode exposed portion of said another cathode terminal.

11. A solid electrolytic capacitor with face-down terminals according to claim 10, wherein the other of said two terminal exposed portions located at said second side serves as a dummy terminal that is not electrically connected to said capacitor element.

12. A solid electrolytic capacitor with face-down terminals according to claim 10, further comprising:

another anode lead drawn out in a direction opposite to the aforementioned anode lead; and another anode terminal having one end connected to said another anode lead and the other end serving as an anode exposed portion exposed at the mount surface, wherein the other of said two terminal exposed portions located at said second side is connected so as to serve as said anode exposed portion of said another anode terminal.

13. A solid electrolytic capacitor with face-down terminals according to claim 8, wherein said solid electrolytic capacitor with face-down terminals has cut surfaces formed by, after overmolding said capacitor element on a lead frame with said casing resin, cutting said lead frame and said casing resin in a direction perpendicular to said first or second side.

14. A solid electrolytic capacitor with face-down terminals according to claim 8, wherein said anode terminal and said cathode terminal are each formed with a film containing at least one of Ag, Au, Cu, Pd, and Sn.

15. A solid electrolytic capacitor with face-down terminals according to claim 13, wherein, except terminal cut surfaces at an outer surface of a product, surfaces of said anode terminal and said cathode terminal parallel to a thickness direction thereof are each formed with a film containing at least one of Ag, Au, Cu, Pd, and Sn.

16. A solid electrolytic capacitor with face-down terminals according to claim 8, wherein said anode terminal has a fillet surface and is formed by a lead frame having a concave-convex portion formed by deforming a portion thereof in a direction perpendicular to the mount surface by either one of drawing and coining, wherein said concave-convex portion serves as a concave portion on a mount surface side and as a convex portion on a side opposite to the mount surface, wherein said concave portion is plated and said convex portion is formed with a flat portion that is parallel to the mount surface and serves as a welding margin with respect to said anode lead, and wherein said cathode terminal has a fillet surface and is formed by a lead frame having a concave portion formed by either one of drawing and coining near a connecting portion with said cathode layer of said capacitor element, said concave portion being plated.

* * * * *